United States Patent
De Freitas Cunha et al.

(10) Patent No.: US 11,681,822 B2
(45) Date of Patent: Jun. 20, 2023

(54) MANAGING SENSITIVE USER INFORMATION

(71) Applicant: International Business Machines Corporation, Armonk, NY (US)

(72) Inventors: Renato Luiz De Freitas Cunha, Sao Paulo (BR); Ana Paula Appel, Sao Paulo (BR); Henrique von Atzingen do Amaral, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 16/442,586

(22) Filed: Jun. 17, 2019

(65) Prior Publication Data

US 2020/0394328 A1     Dec. 17, 2020

(51) Int. Cl.
| | |
|---|---|
| *G06F 21/62* | (2013.01) |
| *G06N 5/022* | (2023.01) |
| *G06N 5/025* | (2023.01) |
| *G06F 40/30* | (2020.01) |
| *H04W 12/02* | (2009.01) |

(52) U.S. Cl.
CPC ..........  *G06F 21/6245* (2013.01); *G06F 40/30* (2020.01); *G06N 5/022* (2013.01); *G06N 5/025* (2013.01); *H04W 12/02* (2013.01)

(58) Field of Classification Search
CPC ..... G06F 21/6245; G06F 40/30; G06N 5/022; G06N 5/025; G06N 20/00; H04W 12/02
See application file for complete search history.

(56) References Cited

U.S. PATENT DOCUMENTS

| | | |
|---|---|---|
| 7,016,919 B2 | 3/2006 | Cotton |
| 7,516,418 B2 | 4/2009 | Herley |

(Continued)

FOREIGN PATENT DOCUMENTS

| | | |
|---|---|---|
| WO | 2008001823 A1 | 1/2008 |
| WO | 2019008548 A1 | 1/2019 |

OTHER PUBLICATIONS

Bonné, B.; Quax, P.; Lamotte, W.; "The Privacy API: Facilitating Insights in How One's Own User Data is Shared," 2017 IEEE European Symposium on Security and Privacy Workshops (EuroS&PW), 2017, pp. 72-75, doi: 10.1109/EuroSPW.2017.54.*

(Continued)

*Primary Examiner* — Victor Lesniewski
(74) *Attorney, Agent, or Firm* — Joseph P. Curcuru

(57) ABSTRACT

In response to identifying one or more applications on a computing device, terms and conditions associated with the one or more applications are identified. A knowledge base based on the identified terms and conditions is generated. The knowledge base includes a determination of sensitive information of a user required by each of the identified one or more applications. Secondary associations of the identified one or more applications are identified from a plurality of external data sources with information related to the identified one or more applications. In response to identifying the secondary associations, it is determined whether sensitive information about the user is found in one or more of the identified secondary associations. In response to determining that sensitive information about the user is found, an advisory is transmitted to the user.

20 Claims, 3 Drawing Sheets

(56) References Cited

U.S. PATENT DOCUMENTS

| | | | |
|---|---|---|---|
| 8,127,360 | B1 | 2/2012 | Wilhelm |
| 8,689,108 | B1 | 4/2014 | Duffield |
| 8,978,092 | B2 | 3/2015 | Balinsky |
| 9,691,090 | B1 | 6/2017 | Barday |
| 9,729,583 | B1 | 8/2017 | Barday |
| 9,892,442 | B2 | 2/2018 | Barday |
| 9,892,444 | B2 | 2/2018 | Barday |
| 10,204,238 | B2 | 2/2019 | Sher-Jan |
| 10,515,212 | B1* | 12/2019 | McClintock ............ G06F 21/57 |
| 11,238,176 | B1* | 2/2022 | Vax ....................... G06F 16/904 |
| 2011/0030067 | A1* | 2/2011 | Wilson ................ G06F 21/6245 712/36 |
| 2011/0145918 | A1 | 6/2011 | Jung |
| 2012/0331567 | A1* | 12/2012 | Shelton .................. G06Q 10/00 726/28 |
| 2014/0165204 | A1 | 6/2014 | Williams |
| 2015/0207819 | A1* | 7/2015 | Sartor ................. G06F 21/6245 726/1 |
| 2016/0132696 | A1* | 5/2016 | Vidhani ................. G06Q 30/00 726/28 |
| 2016/0359828 | A1* | 12/2016 | Thormaehlen ........ H04W 12/02 |
| 2017/0249478 | A1* | 8/2017 | Lovin .................... G06Q 10/00 |
| 2018/0020001 | A1* | 1/2018 | White ................. H04L 63/0428 |
| 2018/0329940 | A1* | 11/2018 | Tiku .................... G06F 21/6245 |
| 2019/0034808 | A1* | 1/2019 | Palanichamy ......... G06N 5/022 |
| 2019/0253523 | A1* | 8/2019 | Raduchel .............. H04L 63/062 |
| 2019/0303611 | A1* | 10/2019 | Lefor ................. G06F 16/2465 |
| 2020/0125746 | A1* | 4/2020 | Joshi ....................... G06F 21/62 |
| 2020/0202036 | A1* | 6/2020 | Baruch ................. H04L 63/101 |
| 2020/0210612 | A1* | 7/2020 | Saad ..................... G06F 3/0649 |

OTHER PUBLICATIONS

Suping, Xie; Huaichu, Chen; Nianlong, Luo; Huilin, Zhang; "Research of Data Sharing between Applications Base on User Request," 2015 7th International Conference on Information Technology in Medicine and Education (ITME), Huangshan, China, 2015, pp. 541-544, doi: 10.1109/ITME.2015.116.*

Clifton et al. "Privacy-preserving data integration and sharing." Proceedings of the 9th ACM SIGMOD workshop on Research issues in data mining and knowledge discovery, Jun. 13, 2004 ACM, Copyright 2004, 8 pages.

Frank, Andrew U.,"Acquiring a digital base map—A theoretical investigation into a form of sharing data." URISA Journal 4.1 (1992): 10-23.

Kish et al., "Unpatients—why patients should own their medical data." © 2015 Nature America, Nature biotechnology 33.9 (2015), 5 pages.

Milne et al. "Information sensitivity typology: Mapping the degree and type of risk consumers perceive in personal data sharing," SPRING 2017, Copyright 2016, Journal of Consumer Affairs 51.1 (2017): 133-161.

Nousala et al. "Building knowledge sharing communities using team expertise access maps." International Journal of Business and Systems Research, vol. 3, No. 3, 2009, Copyright © 2009 Inderscience Enterprises Ltd., 18 pages.

* cited by examiner

MANAGING SENSITIVE USER INFORMATION

BACKGROUND

The present invention relates generally to the field of sensitive information, and more particularly to managing sensitive information about a user.

To put it simply, the world we live in today is a connected world. That is, electronically connected. From the applications (apps) on your desktop or laptop computer to the apps on your smartphone to your smart home running on Internet of Things (IoT) devices we are all plugged in (i.e., connected). Many apps and IoT device can operate without any sensitive or personal information about the person who uses them. However, many apps and IoT devices require varying levels of sensitive information—sometimes only an e-mail address but sometimes an account number or a fingerprint. Sensitive information is found in your social media, your bank, your automobile, your store credit cards, your doctor's and dentist's offices, your government information, virtually everywhere. Sensitive information requires vigilant management.

SUMMARY OF THE INVENTION

Embodiments of the present invention include an approach for managing sensitive information about a user. In one embodiment, in response to identifying one or more applications on a computing device, terms and conditions associated with the one or more applications are identified. A knowledge base based on the identified terms and conditions is generated. The knowledge base includes a determination of sensitive information of a user required by each of the identified one or more applications. Secondary associations of the identified one or more applications are identified from a plurality of external data sources with information related to the identified one or more applications. In response to identifying the secondary associations, it is determined whether sensitive information about the user is found in one or more of the identified secondary associations. In response to determining that sensitive information about the user is found, an advisory is transmitted to the user.

DETAILED DESCRIPTION

Embodiments of the present invention recognizes that sensitive (i.e., personal) information about a user abounds in the public realm. Sensitive information is data about an individual that can be traced back to the individual and that, if disclosed, could result in harm to that person. Some sensitive information loss results in minimal security risk (e.g., aggravation from having to change an e-mail account because the account information was spread on social media). Other lost sensitive information can have a catastrophic financial impact (e.g., a stolen social security number can result in identification theft and loss of money). Today, a method for a user to manage his or her sensitive information is not readily available.

Embodiments of the present invention recognize that there may be a method, computer program product, and computer system for enabling the management of sensitive information about a user. In an embodiment, the method, computer program product, and computer system can determine what a user has agreed to relative to terms and conditions for primary entities that have any sensitive information about the user. A knowledge base of the primary entities and the associated terms and conditions can be generated. External entities can be queried regarding whether the primary entities have entered into agreements with any secondary entities that could include sharing of sensitive information. A notification can be transmitted to the user if sharing of sensitive information is discovered.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
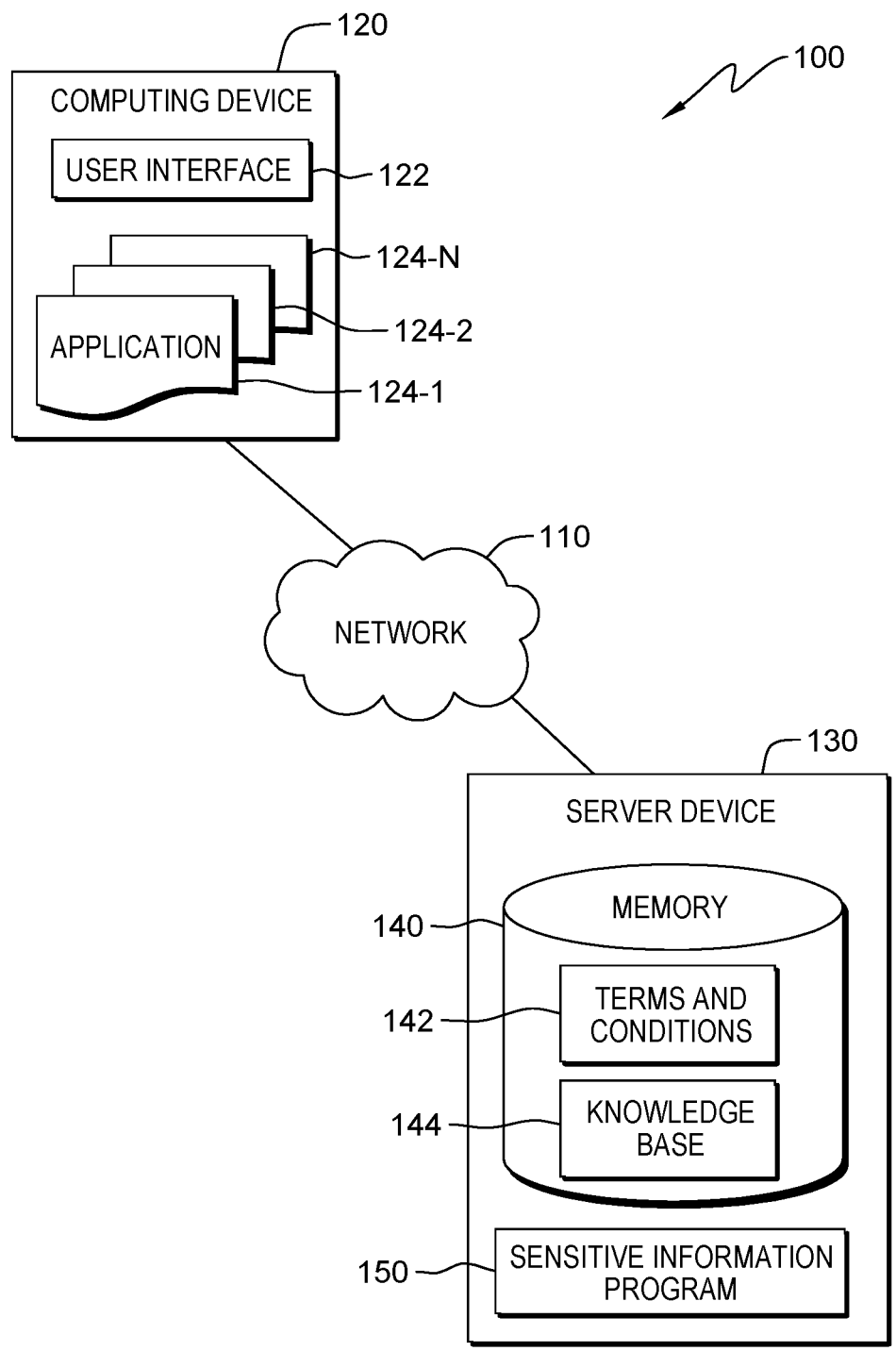
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes computing device 120 and server device 130, interconnected by network 110. In example embodiments, computing environment 100 includes other computing devices (not shown in FIG. 1) such as smartwatches, cell phones, smartphones, wearable technology, phablets, tablet computers, laptop computers, desktop computers, other computer servers or any other computer system known in the art, interconnected with computing device 120 and server device 130 over network 110.

In embodiments of the present invention, computing device 120 and server device 130 are connected to network 110, which enables computing device 120 and server device 130 to access other computing devices and/or data not directly stored on computing device 120 and server device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between computing device 120 and server device 130, and any other computing devices (not shown in FIG. 1) connected to network 110, in accordance with embodiments of the present invention. In an embodiment, data received by another computing device (not shown in FIG. 1) in computing environment 100 is communicated to computing device 120 and server device 130 via network 110.

In embodiments of the present invention, computing device 120 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In certain embodiments, computing device 120 represents a computer system utilizing clustered computers and components (e.g., database server computers, application server computers, etc.) that act as a single pool of seamless resources when accessed by elements of computing environment 100. In general, computing device 120 is representative of any electronic device or combination of electronic devices capable of executing computer readable program instructions. In an embodiment, computing environment 100 includes any number of computing device 120. Computing device 120 includes components as depicted and described in further detail with respect to FIG. 3, in accordance with embodiments of the present invention. Computing device 120 also includes user interface (UI) 122 and application 124-1, application 124-2, and application 124-N.

In an embodiment, user interface 122 provides an interface between a user of computing device 120 and server device 130. User interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 may also be mobile application software that provides an interface between a user of computing device 120 and server device 130. Mobile application software, or an "app," is a computer program designed to run on smart phones, tablet computers and other mobile devices. User interface 122 enables a user of computing device 120 to interact with application 124-N, with server device 130, and with Internet of Things (IoT) devices and other computing device not shown in FIG. 1.

According to embodiments of the present invention, application 124-1, application 124-2, and application 124-N may be a plurality of applications, used by a user of computing device 120, that require some amount of sensitive information about the user. In this paper, discussion concerning application 124-N is applicable for all the plurality of applications 124-N (i.e., 124-1, 124-2, etc.). Further, application 124-N is both singular (i.e., referring to a single application) and plural (i.e., referring to multiple applications). Examples of application 124-N that can require some amount of sensitive information include, but are not limited to, social media applications (apps), employer virtual private networks (VPNs), medical portals, banking apps, and any number of other smartphone apps such as texting apps, weather apps, games, website apps, music apps, shopping apps, and the like.

According to embodiments of the present invention, server device 130 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. In an embodiment, computing environment 100 includes any number of server device 130. Server device 130 includes components as depicted and described in further detail with respect to FIG. 3, in accordance with embodiments of the present invention. Server device 130 also includes a user interface (UI), not shown in FIG. 1, memory 140, and sensitive information program 150.

In an embodiment, memory 140 is storage that is written to and/or read by sensitive information program 150, and any other programs and applications on server device 130. In one embodiment, memory 140 resides on server device 130. In other embodiments, memory 140 resides on computing device 120 or any other device (not shown) in computing environment 100, in cloud storage or on another computing device accessible via network 110. In yet another embodiment, memory 140 represents multiple storage devices within server device 130. Memory 140 may be implemented using any volatile or non-volatile storage media for storing information, as known in the art. For example, memory 140 may be implemented with a tape library, optical library, one or more independent hard disk drives, multiple hard disk drives in a redundant array of independent disks (RAID), solid-state drives (SSD), or random-access memory (RAM). Similarly, memory 140 may be implemented with any suitable storage architecture known in the art, such as a relational database, an object-oriented database, or one or more tables. In an embodiment of the present invention, sensitive information program 150, and any other programs and applications (not shown in FIG. 1) operating on server device 130 may store, read, modify, or write data to memory 140. In an embodiment of the present invention, data stored to memory 140 includes, but is not limited to, data stored to terms and conditions 142 and data stored to knowledge base 144.

According to embodiments of the present invention, terms and conditions 142 is a data structure within memory 140 where terms and conditions of apps used by a user are stored. In an embodiment, the various app terms and conditions indicate what, if any, sensitive information about a user is collected by the app. According to embodiments of the present inventions, sensitive information can include, but is not limited to, an e-mail address and associated password, social media data, biometric data such as a fingerprint or retinal scan, answers to security questions, mobile phone numbers, health information and a means of accessing the same, banking information, social security number, etc.

In an embodiment, knowledge base 144 is a data structure for storing the generated knowledge base. According to an embodiment of the present invention, knowledge base 144 includes, but is not limited to, application 124-N terms and conditions, the associated sensitive information about a user held by application 124-N, and an application map created to indicate the relationships between application 124-N and user sensitive information required by application 124-N. In an embodiment, a user may opt in or opt out of the application map as said map provides a sensitive information roadmap about the user (i.e., the application map provides all the applications that have sensitive information about the user as well as what specific sensitive information). In some embodiments, knowledge base 144 includes a plurality of knowledge bases respectively associated with a plurality of users.

In an embodiment, sensitive information program 150 can be a program, a subprogram of a larger program, an application, a plurality of applications, or mobile application software, which functions to manage sensitive information about a user. A program is a sequence of instructions written by a programmer to perform a specific task. In an embodiment, sensitive information program 150 runs by itself. In other embodiments, sensitive information program 150 depends on system software (not shown in FIG. 1) to execute. In one embodiment, sensitive information program 150 functions as a stand-alone program residing on server device 130. In another embodiment, sensitive information program 150 works in conjunction with other programs, applications, etc., found in computing environment 100. In yet another embodiment, sensitive information program 150 resides on computing device 120. In yet another embodiment, sensitive information program 150 resides on other computing devices (not shown in FIG. 1) in computing environment 100, which are interconnected to computing device 120 and server device 130 via network 110.

In an embodiment, responsive to identifying primary applications utilized by a user, sensitive information program 150 generates a knowledge base that includes (i) terms and conditions agreed to by the user, (ii) associated sensitive information of the user based on said terms and conditions, and (iii) news about the owners of the applications such as whether said sensitive information has been shared with secondary applications. As previously stated, sensitive information is data about an individual that can be traced back to the individual and that, if disclosed, could result in harm to that person. Responsive to user sensitive information being shared, sensitive information program 150 can transmit an advisory to the user (i.e., an advisory notifying the user that user sensitive information has been shared) who, in turn, can request that the user sensitive information be removed. Based on said request, sensitive information program 150 can transmit a remove notice and update the knowledge base.

Figure 2:
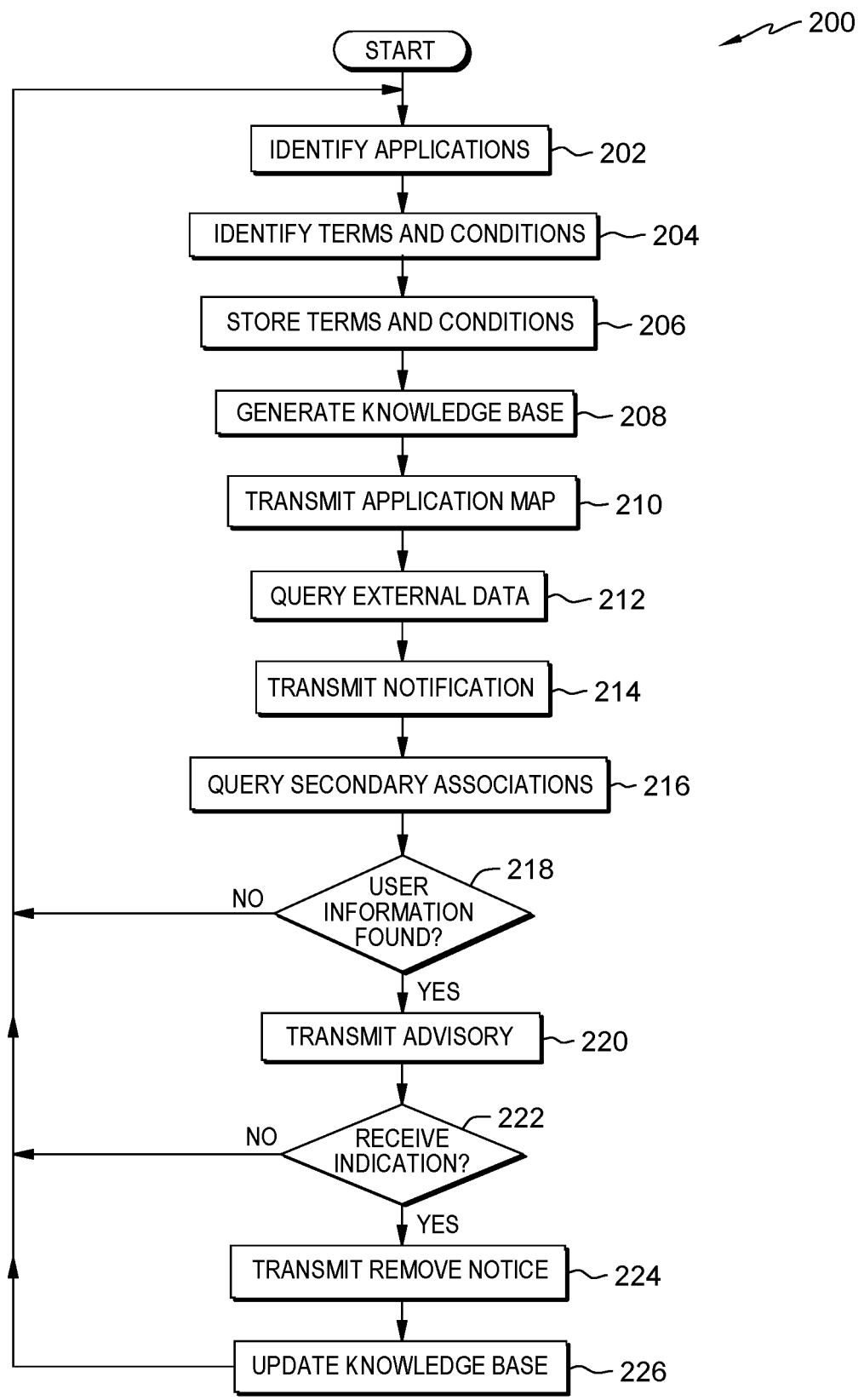
FIG. 2 depicts a flowchart of a program for managing sensitive information about a user, in accordance with an embodiment of the present invention.

FIG. 2 is a flowchart of workflow 200 depicting a method for managing sensitive information about a user. In one embodiment, the method of workflow 200 is performed by sensitive information program 150. In an alternative embodiment, the method of workflow 200 is performed by any other program working with sensitive information program 150. In an embodiment, a user, via user interface 122, invokes workflow 200 upon installing a new application 124-N. In an alternative embodiment, a user invokes workflow 200 upon accessing sensitive information program 150 on server device 130 via network 110.

In an embodiment, sensitive information program 150 identifies applications (step 202). In other words, sensitive information program 150 identifies the plurality of applications (apps) on the one or more computing devices of a user. According to an embodiment of the present invention, the plurality of apps includes pre-installed or user installed software apps that require the user to enter sensitive information of the user. According to the embodiment, the one or more computing device of the user include, but are not limited to, smartphones, smart-watches, other wearable devices, tablet computers, laptop computers, desktop computers, and any other device capable of hosting a software app that requires a user to submit sensitive information. In an embodiment, sensitive information program 150 queries the one or more computing devices of the user to identify the plurality of apps. According to an embodiment of the present invention, sensitive information program 150 on server device 130 queries computing device 120 over network 110 to identify application 124-1, application 124-2, and application 124-N which are considered primary applications. For example, Ann installs a program on a smartphone which determines that the smartphone includes a social media app, a banking app, and a shopping app. In the example, Ann also owns a tablet computer (tablet). The program determines, via a wireless (wi-fi) connection, that the tablet includes the same three apps identified on the smartphone plus an app for an insurance company that Ann uses for insurance needs.

In an embodiment, sensitive information program 150 identifies terms and conditions (step 204). In other words, sensitive information program 150 identifies the various terms and conditions required by the identified apps for use of the apps by the user. In an embodiment, sensitive information program 150 queries the memory of the computing devices to determine whether the user saved the terms and conditions of the identified apps. In another embodiment, sensitive information program 150 queries the identified apps via the Internet to identify the terms and conditions corresponding to the one or more applications on computing device 120. According to an embodiment, sensitive information program 150 identifies the terms and conditions required for use by each of application 124-1, application 124-2, and application 124-N (i.e., the primary applications). For example, the program installed to the smartphone owned by Ann determines the various terms and conditions required by the social media app, the banking app, the shopping app, and the insurance company app.

In an embodiment, sensitive information program 150 stores terms and conditions (step 206). In other words, responsive to identifying the relevant terms and conditions required for use of the identified apps, sensitive information program 150 stores said terms and conditions to a memory. According to an embodiment of the present invention, sensitive information program 150 stores the terms and conditions to a local memory on server device 130. According to another embodiment, sensitive information program 150 stores the terms and conditions to a remote memory, accessible via network 110. In an embodiment, sensitive information program 150 stores the relevant terms and conditions of the primary applications to the terms and conditions 142 location of memory 140 on server device 130. For example, the program stores the terms and conditions of the social media app, the banking app, the shopping app, and the insurance app to available memory on the smartphone.

In an embodiment, sensitive information program 150 generates knowledge base (step 208). In other words, sensitive information program 150 reviews the stored terms and conditions to determine the specific user sensitive information required by each of the identified apps and subsequently generates a knowledge base associating the terms and conditions with the associated specific user sensitive information. According to an embodiment of the present invention, sensitive information program 150 stores the generated knowledge base to knowledge base 144 on server device 130. According to another embodiment, sensitive information program 150 stores the generated knowledge base to any memory accessible by sensitive information program 150 via network 110. In an embodiment, sensitive information program 150 searches each set of terms and conditions (each individual set corresponding to a particular app) for key words and phrases that correlate to user sensitive information (e.g., social security number, phone number, date of birth, password, etc.) using machine learning techniques such as entity resolution, relation extraction, and entity matching as well as deep learning combined with graph mining techniques used as a linking prediction. According to an embodiment of the present invention, sensitive information program 150 searches the primary application terms and conditions stored to terms and conditions 142 on server device 130 for key words and phrases associated with user sensitive information. Subsequent to identifying the key words and phrases, sensitive information program 150 generates the knowledge base and stores said knowledge base to knowledge base 144 on server device 130. For example, the program on the smartphone owned by Ann generates the following knowledge base which has been stored to a memory on the smartphone: (i) the social media app terms and conditions do not require any user sensitive information; (ii) the banking app terms and conditions require Ann's social security number (SSN), user identification (userid) and password, date of birth, and Mom's maiden name; (iii) the shopping app terms and conditions require Ann's credit card number, address, and date of birth (DoB); and (iv) the insurance company terms and conditions require only Ann's social security number.

In an embodiment, sensitive information program 150 transmits application map (step 210). In other words, responsive to generating the knowledge base, sensitive information program 150 creates, stores, and transmits an application map of the information contained in the knowledge base to the user. According to an embodiment of the present invention, the transmitted application map created by sensitive information program 150 shows the associations between the primary apps and the required user sensitive information. In an embodiment, sensitive information program 150 creates an application map, stores said application map to knowledge base 144 in memory 140 on server device 130, and transmits said application map via network 110 to computing device 120; the application map is viewable via user interface 122 on computing device 120. For example, the following associations, created by the program are transmitted by the program to the smartphone owned by Ann for viewing by Ann: (i) social media app requires no user sensitive information; (ii) banking app requires SSN, userid, password, date of birth, Mom's maiden name; (iii) shopping app requires credit card number, address, DoB; and (iv) insurance company app requires SSN.

In an embodiment, sensitive information program 150 queries external data (step 212). In other words, based on the information in the generated knowledge base including the created application map associated with the user, sensitive information program 150 queries external data sources for information related to the identified primary apps found on the one or more computing devices. In an embodiment, external data sources include, but are not limited to, primary app websites, media websites, news aggregators, available ontologies, existing knowledge bases, etc. According to an embodiment, information related to the identified primary apps include, but is not limited to, news about the primary apps and such as has a primary app been acquired by another owner, has a primary app partnered with another company, has the primary app reported a data breach, has a primary app updated its terms and conditions, what other apps are owned by the company that owns a primary app (where user sensitive data may be shared), and the like. In an embodiment, sensitive information program 150 queries external data sources via network 110 to locate information concerning the primary apps (i.e., application 124-1, application 124-2, and application 124-N) on computing device 120. For example, the program queries the Internet for information concerning the social media app, the banking app, the shopping app, and the insurance company app on the tablet owned by Ann.

In an embodiment, sensitive information program 150 transmits notification (step 214). In other words, sensitive information program 150 transmits a notification to the user if external data concerning any of the primary apps is discovered in the query. According to an embodiment, included in the notification is the name or names of any secondary associations discovered in the query (i.e. what new entity is involved with the owner of the primary app). In an embodiment, the notification can be any type of notification known in the art (e.g., a text message, an e-mail, a visual notification such as a blinking light, a haptic notification such as a vibration, an audible notification such as a beep, any combination of the previous notification types, etc.). In an embodiment, sensitive information program 150 transmits an e-mail notification concerning one or more primary apps, which have identified secondary associations, via network 110 to computing device 120 viewable on user interface 122. For example, the program sends an e-mail to Ann that indicates that the parent company of the shopping app (i.e., the primary app) has acquired an outlet chain (i.e., the secondary association) where discounted products can be sold.

In an embodiment, sensitive information program 150 queries secondary associations (step 216). In other words, sensitive information program 150 queries the one or more identified secondary associations for information such as what, if any, user sensitive information the one or more identified secondary associations have obtained about the user, how the user sensitive information is used and stored, and whether the secondary association shares the user sensitive information. According to an embodiment of the present invention, sensitive information program 150 transmits a request to each identified secondary association requesting the information about the user sensitive information that was obtained. In an embodiment, the secondary association does not reply. In another embodiment, the secondary association replies with answers to the requested information. In yet another embodiment, the secondary association replies that the secondary association has not acquired any user sensitive information. According to an embodiment of the present invention, sensitive information program 150 queries one or more secondary associations (not shown in FIG. 1) over network 110 for information about user sensitive information. For example, the program queries the outlet chain to request information on how the outlet chain handles user sensitive information about Ann.

In an embodiment, sensitive information program 150 determines whether user information is found (decision step 218). In other words, responsive to receiving a reply from one or more secondary associations, sensitive information program 150 determines whether the reply includes information that the one or more secondary associations have acquired user sensitive information. In an embodiment, sensitive information program 150 makes the determination by searching the received reply for key words and phrases indicating that the secondary association has acquired user sensitive information. According to an embodiment of the present invention, responsive to determining that a secondary association has acquired user sensitive information, sensitive information program 150 updates the knowledge base and application map associated with the user with the sensitive information acquired by the secondary association. In an embodiment (decision step 218, NO branch), sensitive information program 150 determines that user sensitive information was not found (i.e., not acquired by the secondary association); therefore, sensitive information program 150 returns to step 202 to identify additional applications. In the embodiment (decision step 218, YES branch), sensitive information program 150 determines that user sensitive information was found (i.e., acquired by the secondary association); therefore, sensitive information program 150 proceeds to step 220 to transmit an advisory to the user.

In an embodiment, sensitive information program 150 transmits advisory (step 220). In other words, sensitive information program 150, responsive to determining that one or more secondary associations have acquired user sensitive information about the user, sensitive information program 150 transmits an advisory to the user. According to an embodiment, the advisory includes, but is not limited to, the name of the secondary association, what user sensitive information the secondary association has about the user, how the secondary associations uses and stores the acquired user sensitive information, and whether the secondary association shares the user sensitive information. In an embodiment, the transmitted advisory can be any type of notification known in the art (as described above). According to an embodiment of the present invention, sensitive information program 150 transmits an advisory over network 110 to computing device 120 which can be viewed on user interface 122. For example, the program sends an advisory to Ann indicating that the outlet chain has acquired Ann's credit card number from the shopping app. The shopping app did not share Ann's other sensitive information (i.e., did not share Ann's address or DoB) with the outlet chain.

In an embodiment, sensitive information program 150 determines whether an indication was received (decision step 222). In other words, responsive to sending the advisory, sensitive information program 150 determines whether an indication was received from the user. According to an embodiment, the indication includes, but is not limited to, a request to have the user sensitive information deleted by the secondary association. In an embodiment (decision step 222, NO branch), sensitive information program 150 does not receive an indication from the user; therefore, sensitive information program 150 returns to step 202 to identify additional applications. In the embodiment (decision step 222, YES branch), sensitive information program 150 does receive an indication from the user; therefore, sensitive information program 150 proceeds to step 224 to transmit a remove notice.

In an embodiment, sensitive information program 150 transmits remove notice (step 224). In other words, responsive to receiving an indication from the user, sensitive information program 150 transmits a remove notice to one or more secondary associations that have acquired user sensitive information. According to an embodiment, the remove notice can include, but is not limited to, a request to remove (i.e., delete) the user sensitive information and a request for confirmation that the user sensitive information has been removed by the secondary association. In an embodiment, sensitive information program 150 transmits a remove notice via network 110 to one or more secondary associations (not shown in FIG. 1); in the embodiment, sensitive information program 150 receives a confirmation from one or more secondary associations. For example, Ann indicates to the user that the outlet chain should delete Ann's SSN. In response, the program sends a remove notice to the outlet chain and receives a confirmation that the SSN has been deleted from the database used by the outlet chain.

According to an embodiment of the present invention, sensitive information program 150 transmits additional remove notices if no confirmation is received from the one or more secondary associations. In an embodiment, the additional remove notices are sent on a user-defined time interval (e.g., every other day, every third day, once per week, etc.). In another embodiment, the time interval is determined by sensitive information program 150 based on the history of received confirmations. According to an embodiment, if no confirmation is received after a user-defined number of additional remove notices are sent, sensitive information program 150 does not update the knowledge base and identifies the one or more secondary associations in the next query of secondary associations. Further in the embodiment, sensitive information program 150 indicates to the user that no confirmation was received from the one or more secondary associations.

In an embodiment, sensitive information program 150 updates knowledge base (step 226). In other words, responsive to receiving a confirmation that the user sensitive information has been removed by the secondary association, sensitive information program 150 updates the knowledge base and application map to show that the identified secondary association no longer has user sensitive information. According to an embodiment of the present invention, sensitive information program 150 updates knowledge base 144 and the relevant application map (not shown in FIG. 1) in memory 140 on server device 130. For example, the program updates the knowledge base and relevant application map to show that the outlet chain has deleted Ann's SSN from its database.

Figure 3:
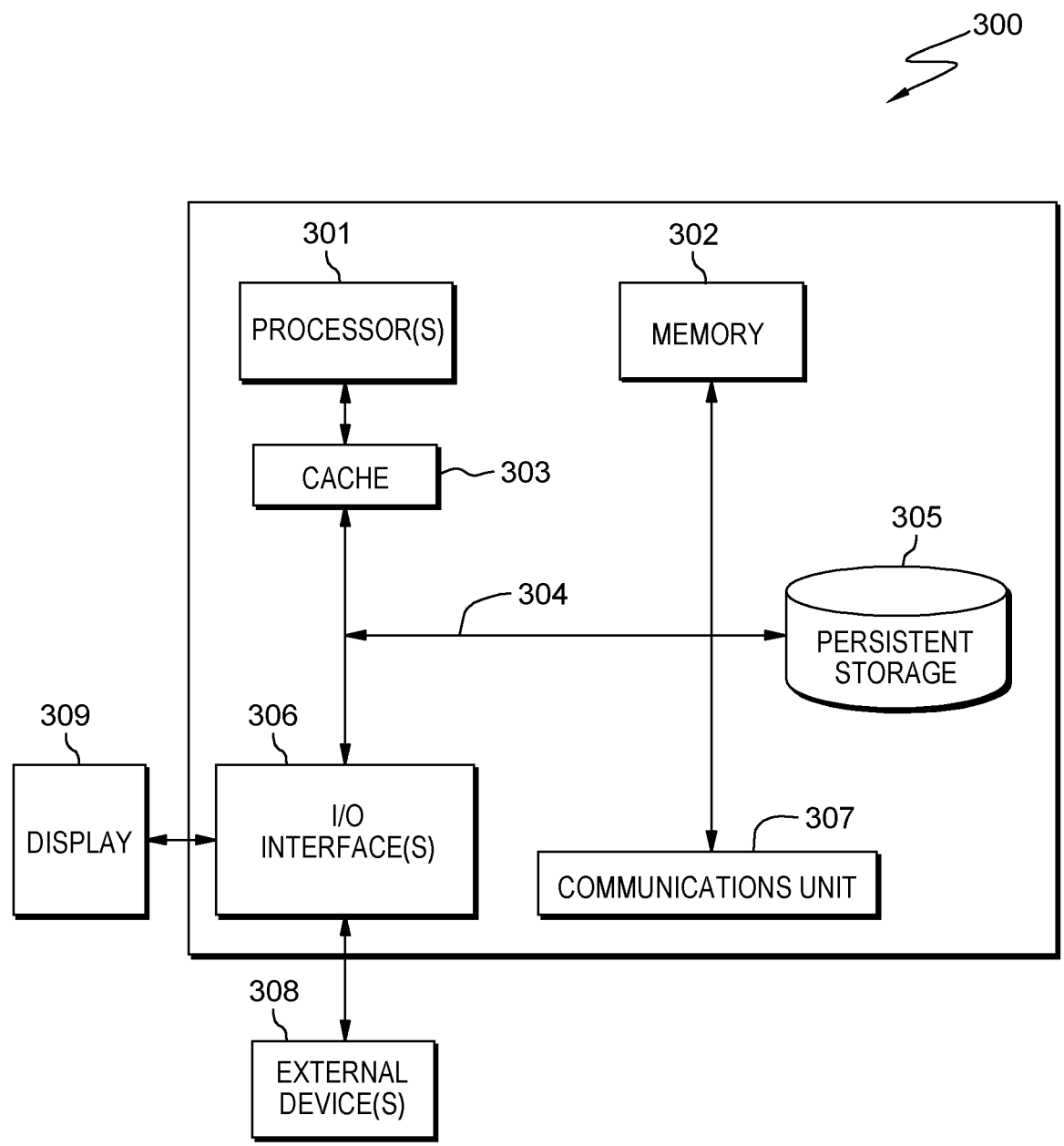
FIG. 3 depicts a block diagram of components of the computing environment of FIG. 1, in accordance with an embodiment of the present invention.

FIG. 3 depicts computer system 300, which is an example of a system that includes sensitive information program 150. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method, the computer-implemented method comprising:
    responsive to identifying one or more applications on a computing device, identifying, by one or more computer processors, terms and conditions associated with the one or more applications, wherein identifying the terms and conditions comprises:
        querying a computing device or the one or more applications to determine the terms and conditions associated with the one or more applications;
    responsive to identifying primary applications utilized by a user, generating a knowledge base comprising: the terms and conditions agreed to by the user, associated sensitive information of the user based on the terms and conditions, and news regarding the owners of the applications, wherein the news comprises information detailing whether the sensitive information has been shared with one or more secondary applications;
    parsing the terms and conditions for key words and phrases that correlate to sensitive information associated to a user;
    responsive to generating the knowledge base based on the identified terms and conditions, creating, by one or more computer processors, an application map;
    querying a plurality of external data sources for information related to the primary application found on the one or more computing devices based on the information in the generated knowledge base and the application map associated with the user;
    identifying, by one or more computer processors, from the plurality of external data sources with information related to the identified one or more applications, secondary associations of the identified one or more applications;
    responsive to identifying the secondary associations of the identified one or more applications, determining, by one or more computer processors, whether sensitive information about the user is found in one or more of the identified secondary associations; and
    responsive to determining that sensitive information about the user is found, transmitting, by one or more computer processors, an advisory to the user, wherein the advisory comprises a name of the secondary association, what user sensitive information the secondary association has about the user, how the secondary associations uses and stores the acquired user sensitive information, and whether the secondary association shares the user sensitive information.

2. The method of claim 1, further comprising:
    responsive to transmitting the advisory to the user, determining, by one or more computer processors, whether an indication is received from the user, wherein the indication is a request to remove sensitive information about the user from the identified secondary associations;
    responsive to determining that an indication is received from the user, transmitting, by one or more computer processors, a remove notice to the identified secondary associations; and
    updating, by one or more computer processors, the generated knowledge base.

3. The method of claim 2, further comprising:
    responsive to determining that an indication is not received from the user, identifying, by one or more computer processors, one or more new applications on the computing device.

4. The method of claim 1, further comprising:
    storing, by one or more computer processors, the identified terms and conditions associated with the one or more applications to a memory.

5. The method of claim 1, further comprising:
    wherein the application map shows associations between the identified one or more applications and the sensitive information required by the identified one or more applications as specified in the terms and conditions associated with the identified one or more applications;
    storing, by one or more computer processors, the created application map to a memory; and
    transmitting, by one or more computer processors, the created application map to the user.

6. The method of claim 1, further comprising:
    responsive to identifying secondary associations to the identified one or more applications, transmitting, by one or more computer processors, a notification to the user, wherein the notification includes one or more names of the identified secondary associations.

7. The method of claim 1, further comprising:
    responsive to determining that sensitive information about the user is not found, identifying, by one or more computer processors, one or more new applications on the computing device.

8. A computer program product, the computer program product comprising:
    one or more computer readable storage media; and program instructions stored on the one or more computer readable storage media, the program instructions comprising:
responsive to identifying one or more applications on a computing device, program instructions to identify terms and conditions associated with the one or more applications, wherein identifying the terms and conditions comprises:
program instructions to query a computing device or the one or more applications to determine the terms and conditions associated with the one or more applications;
responsive to identifying primary applications utilized by a user, program instructions to generate a knowledge base comprising: the terms and conditions agreed to by the user, associated sensitive information of the user based on the terms and conditions, and news regarding the owners of the applications, wherein the news comprises information detailing whether the sensitive information has been shared with one or more secondary applications;
program instructions to parse the terms and conditions for key words and phrases that correlate to sensitive information associated to a user;
responsive to generating the knowledge base based on the identified terms and conditions, program instructions to create, by one or more computer processors, an application map;
program instructions to query a plurality of external data sources for information related to the primary application found on the one or more computing devices based on the information in the generated knowledge base and the application map associated with the user;
program instructions to identify from the plurality of external data sources with information related to the identified one or more applications, secondary associations of the identified one or more applications;
responsive to identifying the secondary associations of the identified one or more applications, program instructions to determine whether sensitive information about the user is found in one or more of the identified secondary associations; and
responsive to determining that sensitive information about the user is found, program instructions to transmit an advisory to the user, wherein the advisory comprises a name of the secondary association, what user sensitive information the secondary association has about the user, how the secondary associations uses and stores the acquired user sensitive information, and whether the secondary association shares the user sensitive information.

9. The computer program product of claim 8, further comprising program instructions stored on the one or more computer readable storage media, to:
responsive to transmitting the advisory to the user, determine whether an indication is received from the user, wherein the indication is a request to remove sensitive information about the user from the identified secondary associations;
responsive to determining that an indication is received from the user, transmit a remove notice to the identified secondary associations; and
update the generated knowledge base.

10. The computer program product of claim 9, further comprising program instructions stored on the one or more computer readable storage media, to:
responsive to determining that an indication is not received from the user, identifying, by one or more computer processors, one or more new applications on the computing device.

11. The computer program product of claim 8, further comprising program instructions stored on the one or more computer readable storage media, to:
store the identified terms and conditions associated with the one or more applications to a memory.

12. The computer program product of claim 8, further comprising program instructions stored on the one or more computer readable storage media, to:
wherein the application map shows associations between the identified one or more applications and the sensitive information required by the identified one or more applications as specified in the terms and conditions associated with the identified one or more applications;
store the created application map to a memory; and
transmit the created application map to the user.

13. The computer program product of claim 8, further comprising program instructions stored on the one or more computer readable storage media, to:
responsive to identifying secondary associations to the identified one or more applications, transmit a notification to the user, wherein the notification includes one or more names of the identified secondary associations.

14. The computer program product of claim 8, further comprising program instructions stored on the one or more computer readable storage media, to:
responsive to determining that sensitive information about the user is not found, identify one or more new applications on the computing device.

15. A computer system, the computer system comprising:
one or more computer processors;
one or more computer readable storage media; and
program instructions stored on the one or more computer readable storage media for execution by at least one of the one or more computer processors, the program instructions comprising:
responsive to identifying one or more applications on a computing device, program instructions to identify terms and conditions associated with the one or more applications, wherein identifying the terms and conditions comprises:
program instructions to query a computing device or the one or more applications to determine the terms and conditions associated with the one or more applications;
responsive to identifying primary applications utilized by a user, program instructions to generate a knowledge base comprising: the terms and conditions agreed to by the user, associated sensitive information of the user based on the terms and conditions, and news regarding the owners of the applications, wherein the news comprises information detailing whether the sensitive information has been shared with one or more secondary applications;
program instructions to parse the terms and conditions for key words and phrases that correlate to sensitive information associated to a user;
responsive to generating the knowledge base based on the identified terms and conditions, program instructions to create, by one or more computer processors, an application map;
program instructions to query a plurality of external data sources for information related to the primary application found on the one or more computing devices based on the information in the generated knowledge base and the application map associated with the user;

program instructions to identify from the plurality of external data sources with information related to the identified one or more applications, secondary associations of the identified one or more applications;

responsive to identifying the secondary associations of the identified one or more applications, program instructions to determine whether sensitive information about the user is found in one or more of the identified secondary associations; and responsive to determining that sensitive information about the user is found, program instructions to transmit an advisory to the user, wherein the advisory comprises a name of the secondary association, what user sensitive information the secondary association has about the user, how the secondary associations uses and stores the acquired user sensitive information, and whether the secondary association shares the user sensitive information.

16. The computer system of claim 15, further comprising program instructions stored on the one or more computer readable storage media for execution by at least one of the one or more computer processors, to:

responsive to transmitting the advisory to the user, determine whether an indication is received from the user, wherein the indication is a request to remove sensitive information about the user from the identified secondary associations;

responsive to determining that an indication is received from the user, transmit a remove notice to the identified secondary associations; and update the generated knowledge base.

17. The computer system of claim 15, further comprising program instructions stored on the one or more computer readable storage media for execution by at least one of the one or more computer processors, to:

store the identified terms and conditions associated with the one or more applications to a memory.

18. The computer system of claim 15, further comprising program instructions stored on the one or more computer readable storage media for execution by at least one of the one or more computer processors, to:

wherein the application map shows associations between the identified one or more applications and the sensitive information required by the identified one or more applications as specified in the terms and conditions associated with the identified one or more applications;

store the created application map to a memory; and transmit the created application map to the user.

19. The computer system of claim 15, further comprising program instructions stored on the one or more computer readable storage media for execution by at least one of the one or more computer processors, to:

responsive to identifying secondary associations to the identified one or more applications, transmit a notification to the user, wherein the notification includes one or more names of the identified secondary associations.

20. The computer system of claim 15, further comprising program instructions stored on the one or more computer readable storage media for execution by at least one of the one or more computer processors, to:

responsive to determining that sensitive information about the user is not found, identify one or more new applications on the computing device.

* * * * *